(12) United States Patent
Horn et al.

(10) Patent No.: US 6,754,673 B2
(45) Date of Patent: Jun. 22, 2004

(54) METHOD AND SYSTEM FOR ASSESSING PLANT PARAMETERS AND PERFORMANCE OVER A GLOBAL NETWORK

(75) Inventors: Ronald Martin Horn, Palo Alto, CA (US); James Maclaine Huff, Boulder Creek, CA (US); Jenny Y. Mui, San Jose, CA (US); Sandra Anne Delvin, San Jose, CA (US)

(73) Assignee: General Electric Company, Schenectady, NY (US)

( * ) Notice: Subject to any disclaimer, the term of this patent is extended or adjusted under 35 U.S.C. 154(b) by 575 days.

(21) Appl. No.: 09/748,145

(22) Filed: Dec. 27, 2000

(65) Prior Publication Data

US 2001/0053940 A1 Dec. 20, 2001

Related U.S. Application Data

(60) Provisional application No. 60/211,877, filed on Jun. 14, 2000.

(51) Int. Cl.⁷ .......................... G06F 17/30; G06F 7/00; G06F 19/00; G21C 19/00
(52) U.S. Cl. .................... 707/104.1; 707/100; 707/101; 707/102; 707/103 R; 700/32; 700/213; 700/108; 376/260
(58) Field of Search ................................ 707/100, 101, 707/102, 103 R, 104.1; 700/213, 32, 108; 376/260

(56) References Cited

U.S. PATENT DOCUMENTS

| | | | | |
|---|---|---|---|---|
| 4,163,365 A | * | 8/1979 | Frutschi ........................ 60/773 |
| 4,358,930 A | * | 11/1982 | Pope et al. .................... 60/647 |
| 4,410,950 A | * | 10/1983 | Toyoda et al. ................. 701/99 |
| 5,134,574 A | * | 7/1992 | Beaverstock et al. ......... 702/84 |
| 5,790,413 A | * | 8/1998 | Bartusiak et al. ........... 700/174 |
| 5,791,147 A | * | 8/1998 | Earley et al. ................. 60/646 |
| 5,793,636 A | * | 8/1998 | Cooney et al. .............. 700/213 |
| 5,794,446 A | * | 8/1998 | Earley et al. ................. 60/646 |
| 5,913,184 A | * | 6/1999 | Girbig ......................... 702/182 |
| 6,012,290 A | * | 1/2000 | Garcia .......................... 60/676 |
| 6,117,854 A | * | 9/2000 | Silverman et al. ............ 514/89 |
| 6,202,405 B1 | * | 3/2001 | Beyer et al. .................. 60/267 |
| 6,591,225 B1 | * | 7/2003 | Adelman et al. ........... 702/182 |

OTHER PUBLICATIONS

Borkin et al., THe Development of Three–Dimensional Spatial Techniques for the Construction Planning of Nuclear Power Plants, pp. 341–347.*

* cited by examiner

Primary Examiner—Frantz Coby
(74) Attorney, Agent, or Firm—Nixon & Vanderhye P.C.

(57) ABSTRACT

Plant parameters and performance of an industrial plant such as a boiling water nuclear reactor plant can be assessed over a global network. Plant parameter and performance data are compiled from a plurality of operating plants, and this data is stored in a categorized historical database. Users are provided access to the historical database over the global network to perform self-assessments and generate comparison graphics showing percentile ranking, trending, etc. Data generated at a particular plant can be downloaded to a server site for more detailed engineering analyses using conventional methods. Reports and commentary on the analyses can be returned to the user via the global network.

9 Claims, 6 Drawing Sheets

GE PLEDGE- Chem Database | Chem Database (fleet) - Netscape

File Edit View Go Window Help

Back Reload Home Search My Netscape Print Security Shop

Bookmarks Netsite: http://chimaera.apexinteractive.com/pledge/chem_db_fleet.jsp

LOGO

| GE Home | GE Power | GE PLEDGE- Chem | Our Mission | News & Info | Our Experts | Contact Us | Help |

Resources
Chem Database (fleet)
Plant Rankings
GENE Issued Papers
Noble Chem Update

PLEDGE Tools
Guidelines Calcs
Samples & Demos
Interactive Running
Scenario Plots

Chem Database
Yearly Averages
Cycle Averages
Daily Averages

Upcoming Functions
Download PLEDGE Runs
Future PLEDGE Improvements
Added Chem Database Features

*GE PLEDGE-Chem Database*

GE PLEDGE-Chem Database | Chem Database

- Feedwater
  Copper Mean Values: 1999 Bar Chart ▽

- Reactor Water
  Chloride Mean Values: 1999 Bar Chart ▽

- INPO & WANO Plots
  INPO Rankings ▽

Privacy Policy | Terms of Use

GE PLEDGE-Chem Database

GE PLEDGE-Chem Database | Daily Averages

Complete the form as requested below and submit to obtain historical data online.

Select One Plant ID: TS07 ▽

Input Time Period (mm/dd/yyyy): 01 / 01 / 1993 - 01 / 01 / 1995

Select Sample Location: Reactor Water ▽

Select Species: Co60 ▽

[Submit]

Privacy Policy | Terms of Use

Resources
- Chem Database (fleet)
- Plant Rankings
- GENE Issued Papers
- Noble Chem Update

PLEDGE Tools
- Guidelines Calcs
- Samples & Demos
- Interactive Running
- Scenario Plots

Chem Database
- Yearly Averages
- Cycle Averages
- Daily Averages

Upcoming Functions
- Download PLEDGE Runs
- Future PLEDGE Improvements
- Added Chem Database Features

Fig. 4

METHOD AND SYSTEM FOR ASSESSING PLANT PARAMETERS AND PERFORMANCE OVER A GLOBAL NETWORK

This application claims the benefit of U.S. Provisional Patent Application Serial No. 60/211,877, filed Jun. 14, 2000, the entire content of which is herein incorporated by reference.

BACKGROUND OF THE INVENTION

This invention relates to assessing plant parameters and performance and, more particularly, to a method and system of assessing boiling water nuclear reactor plant parameters and performance over a global network using categorized historical data from a boiling water nuclear reactor fleet.

In order to assess boiling water reactor plant parameters and performance, a historical database of plant parameter and performance data is maintained and regularly updated. Such data is useful to enable specialists to analyze current data from a reactor plant to assess reactor performance and predict reactor behavior.

For example, in a boiling water nuclear reactor, the determining of water chemistry characteristics including conductivity, key anionic species, radioactive products and the like is an important factor to assess plant parameters and predict reactor performance. Historical data is particularly useful for detecting fuel degradation due to mis-maintained water chemistry and for evaluating long term effects such as radiation dose buildup in different reactor components. The information is also relevant to the general operation of the plant and the behavior of structural materials of which the plant is constructed. Using historical data stored in a historical database, effective engineering assessments can be used for assessing reactor problems, predicting reactor trends and performance and for improving reactor trends and performance.

Current methods for compiling parameter and performance data for the historical database, however, require transmittal of data and engineering reports manually or in batch form. With the transmitted data, the data recipient can prepare trending and percentile graphics for plant assessments determined based on the existing historical data. The process is time consuming and inefficient. Moreover, the process restricts the ability to perform past and future assessments in a single time span while also restricting access and use of data to a limited number of specialists.

BRIEF SUMMARY OF THE INVENTION

In an exemplary embodiment of the invention, a method of assessing plant parameters and performance over a global network includes (a) compiling plant parameter and performance data from a plurality of operating plants, (b) storing the plant parameter and performance data in a categorized historical database, and (c) enabling access to the historical database over a global network. Step (a) may be practiced by receiving the plant parameter and performance data from the plurality of operating plants over the global network. The method may additionally include comparing plant parameter and performance data among the plurality of operating plants based on the plant parameter and performance data stored in the historical database. In this context, step (b) is practiced by storing the plant parameter and performance data in the categorized historical database according to plant type, wherein the comparing step is practiced by comparing plant parameter and performance data by plant type. The method may include performing engineering assessments based on the plant parameter and performance data stored in the historical database. Step (c) may be practiced by enabling categorized access to the historical database according to input parameters.

In one arrangement, a plurality of operating plants are boiling water nuclear reactor plants, wherein the plant parameter and performance data includes reactor water chemistry characteristics and reactor performance data. In this context, step (c) is practiced by enabling access to the historical database to determine current reactor performance trends and to predict future reactor behavior. Step (c) may be further practiced by enabling categorized access to the historical database according to input parameters and by displaying data for a particular one of the plurality of operating plants.

In another exemplary embodiment of the invention, a computer system for assessing plant parameters and performance over a global network includes at least one user computer running a computer program that effects compiling of plant parameter and performance data from a plurality of operating plants. The user computer stores the plant parameter and performance data in a categorized historical database. The system server runs a server program, wherein the user computer and system server are interconnected by a computer network. The system server enables access to the historical database over the computer network.

In still another exemplary embodiment of the invention, a computer program embodied on a computer readable medium for assessing plant parameters and performance over a global network is configured to effect the method of the invention.

BRIEF DESCRIPTION OF THE DRAWINGS

FIG. 2 is a sample screen for selecting elements to view;

FIG. 3 is a sample input screen;

FIG. 4 is a sample screen showing selection of input parameters for interactive assessments;

DETAILED DESCRIPTION OF THE INVENTION

Figure 1:
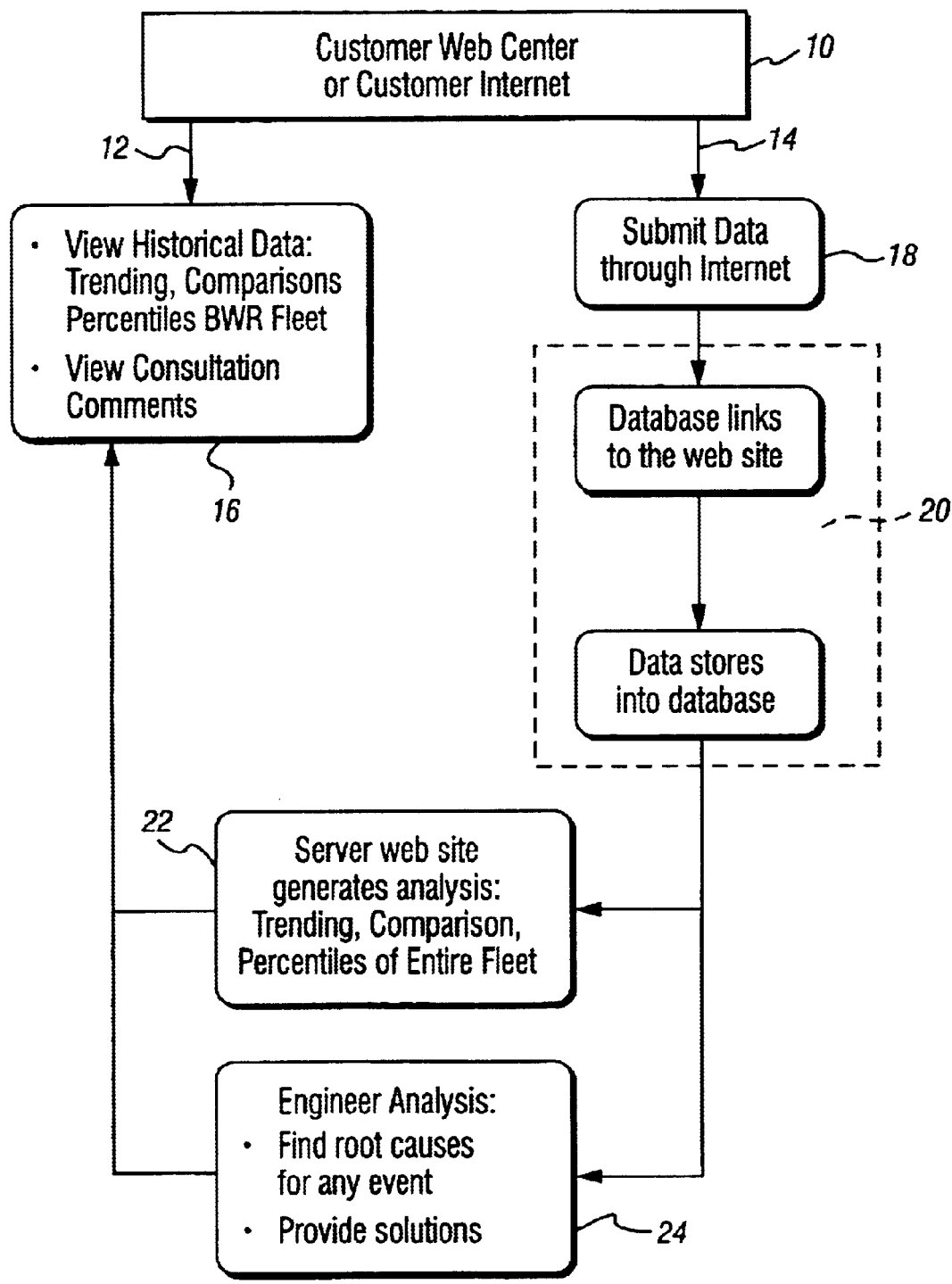
FIG. 1 is a schematic illustration of the web site database architecture.

The plant assessing system implemented in the diagrams of FIGS. 1–5 is preferably a browser-based system in which a program running on a user's computer (the user's web browser) requests information from a server program running on a system server. The system server sends the requested data back to the browser program, and the browser program then interprets and displays the data on the user's computer screen. The process is as follows:

1. The user runs a web browser program on his/her computer.
2. The user connects to the server computer (e.g., via the Internet). Connection to the server computer may be conditioned upon the correct entry of a password as is well known.
3. The user requests a page from the server computer. The user's browser sends a message to the server computer that includes the following:

the transfer protocol (e.g., http://); and the address, or Uniform Resource Locator (URL).

4. The server computer receives the user's request and retrieves the requested page, which is composed, for example, in HTML (Hypertext Markup Language).

5. The server then transmits the requested page to the user's computer.

6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the plant assessing system of the present invention include Netscape® Navigator available from Netscape® Communications Corporation and Internet Explorer available from Microsoft® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the plant assessing system described below and illustrated in the accompanying drawings.

Figure 6:
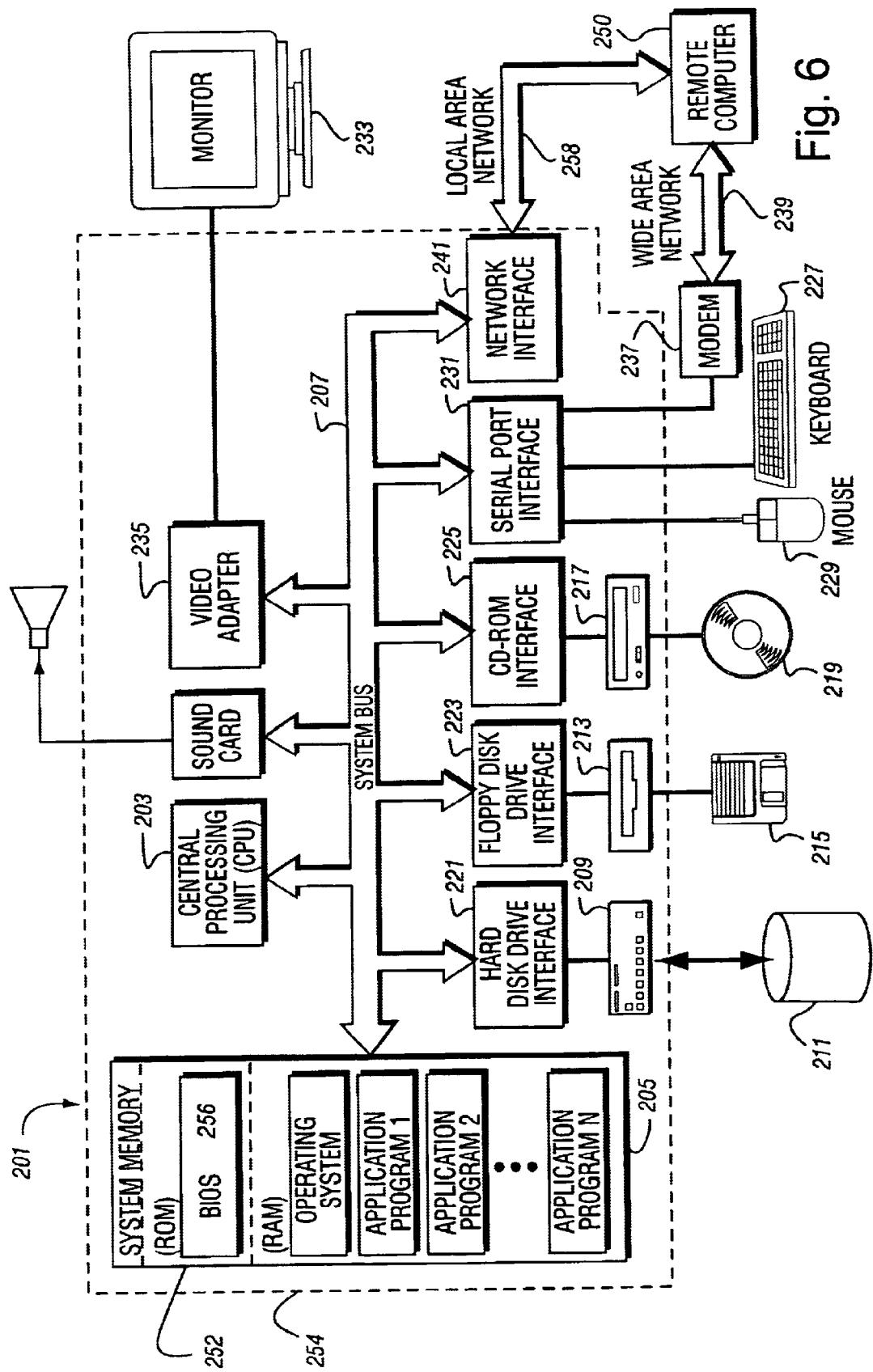
FIG. 6 is a schematic block diagram illustrating the components of a computer.

FIG. 6 generally illustrates a computer system 201 suitable for use as the client and server components of the plant assessing system of the invention. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used, and the invention is not limited in this respect.

In a boiling water nuclear reactor, it is important to maintain and periodically sample water chemistry for characteristics such as conductivity, key species, radioactive products and the like. Improperly maintained water chemistry can result in fuel degradation, thus reducing plant performance. Using historical data, for example, of similar type plants and water chemistry, engineers can assess plant parameters and performance of a currently operating plant. Historical data can also be used to assess general operation of the plant and behavior of structural materials of which the plant was constructed. Such information is invaluable for engineering assessments, predicting trends, etc.

Figure 3:
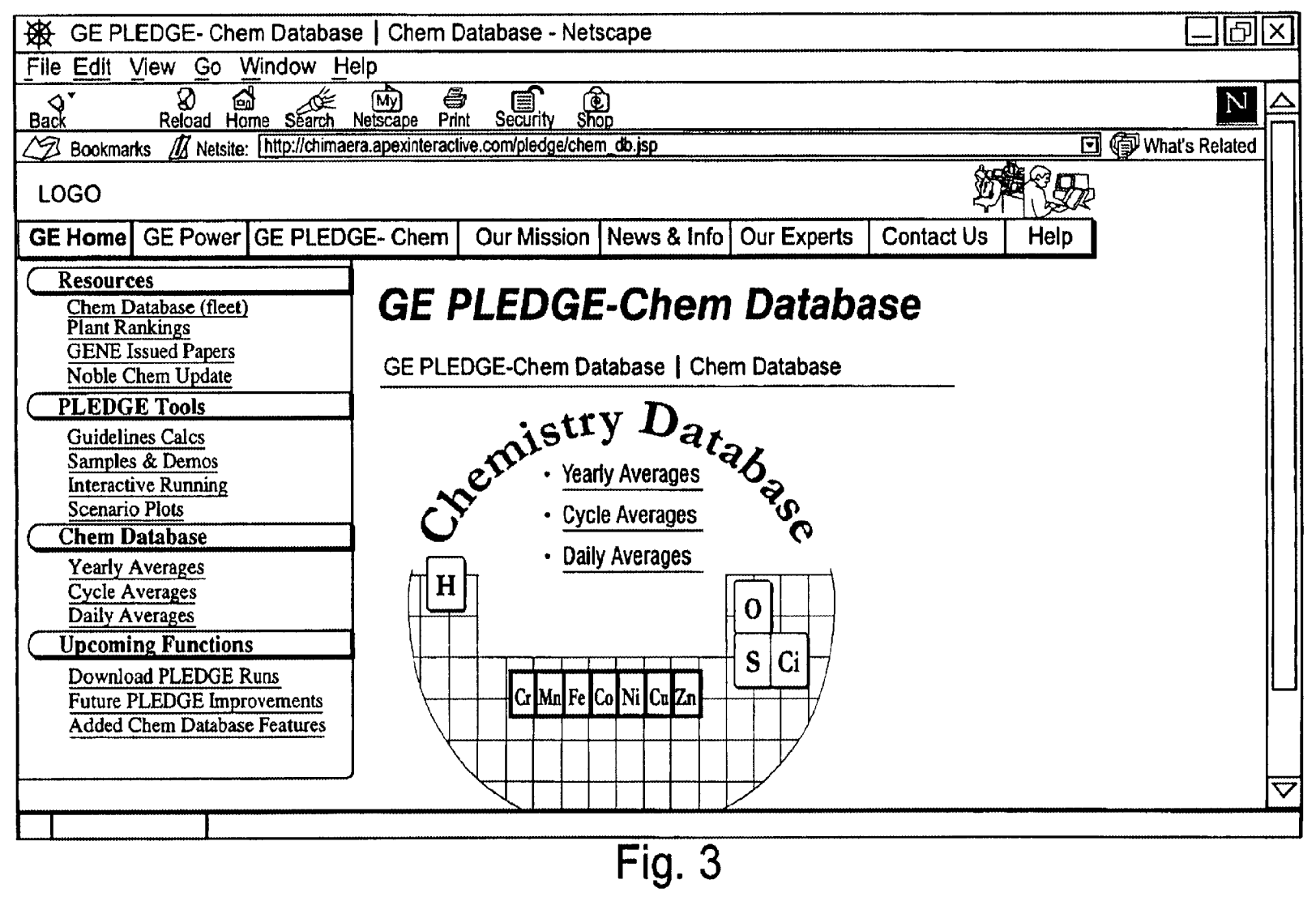
Figure 5:
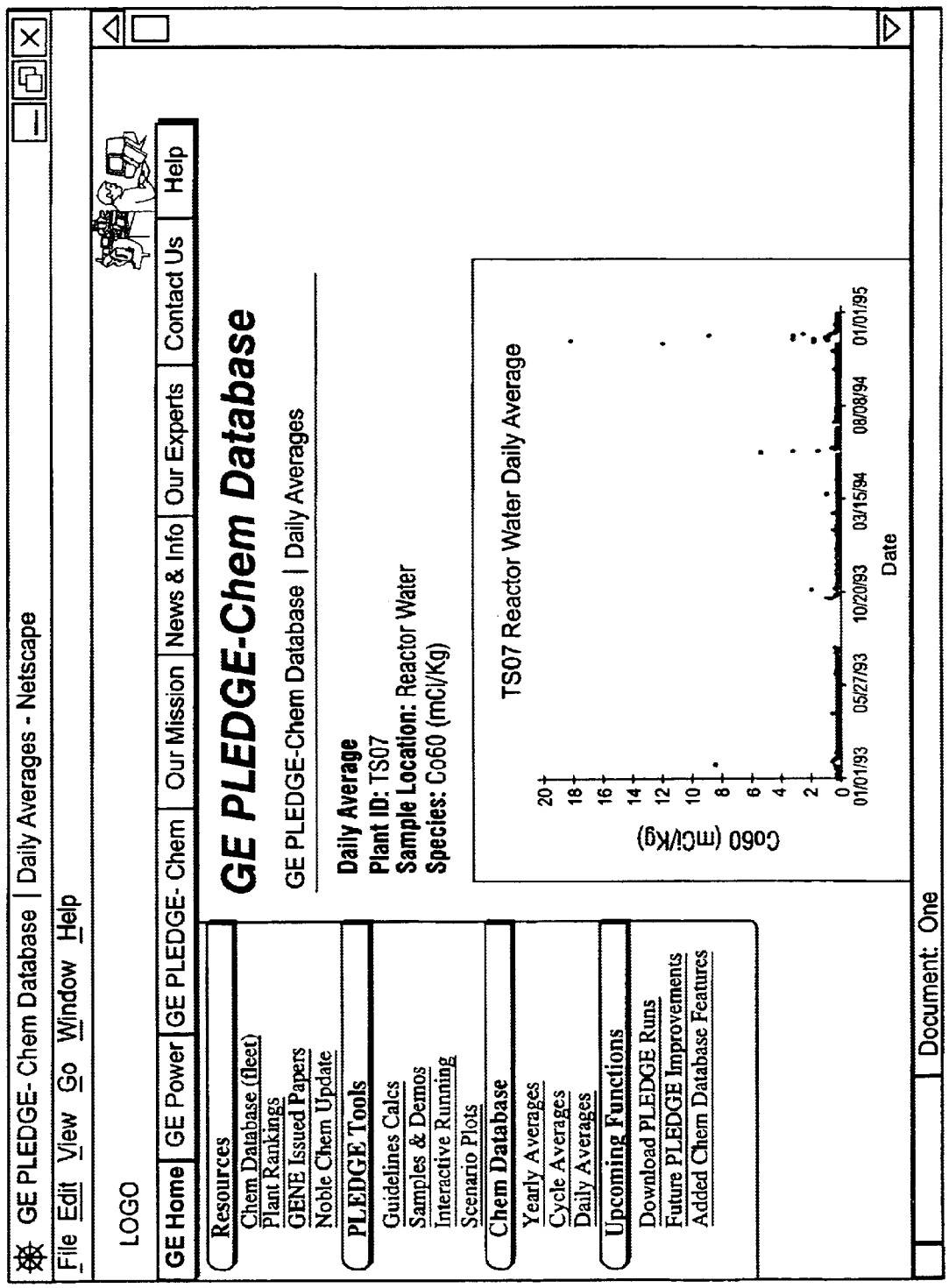
FIG. 5 is a sample screen illustrating an example output plot of data from the interactive evaluation of the parameter of interest for a specific plant.

The process schematic in FIG. 1 shows the interactivity between the user and the server site for submittal of data, viewing performance trending data and graphical reports generation. Referring to FIG. 1, from a home page or server site 10, a user can select an analysis link 12 or a link 14 for submitting plant information to the database. The analysis link 12 provides access to the historical database and/or consultation comments at a page 16. For example, as shown in FIG. 2, the user can access the historical database according to input parameters to display a particular graphical representation. In FIG. 2, the user selects the field of interest: (1) Feedwater, (2) Reactor Water or (3) INPO & WANO Plots for viewing. FIGS. 3–5 illustrate another example of access to the historical database, wherein FIG. 3 provides links to options for Yearly Averages, Cycle Averages or Daily Averages. In FIG. 4, the user has selected "Daily Averages," and the user is prompted (e.g., via drop-down menus as illustrated) to input parameters for generating an output display based on historical data. FIG. 5 is an exemplary output plot. As noted, the historical data enables users to perform internal self-assessments for trends and comparisons by percentiles with other plants including other plants of the same type. Customized capabilities can be also added as required.

The users can also access consultation comments and engineering analyses based on data input via link 14.

Through link 14, users submit categorized data using drop-down menus and the like. The server receives the categorized data and stores the data into the historical database via process link 20.

A server access site 22 generates analysis data according to known principles based on data submitted via link 14 and the historical data stored in the historical database. The server web site 22 can generate analyses based on this data with respect to trending, comparisons with other plants, and percentiles of the entire fleet. As such, users can readily interact with the web site to perform self-assessments and compare plant performance with similar type plants.

Block 24 represents engineering analyses that can be performed using plant data submitted through the Internet or via conventional means. The analyses are performed using known high-level techniques based on the historical data stored in the historical database. The analyses are typically used for finding root causes for particular events, providing solutions and suggestions, and the like. When completed, the analyses are posted with commentary for user review via page 16. Alternatively, the analyses may be forwarded to the user by conventional means.

In the following example, an application of the invention will be described in conjunction with a fleet of boiling water nuclear reactors and corresponding historical database. The invention, however, is not meant to be particularly limited to the described application. Assume a particular reactor plant is having problems with cracking in a particular component. The plant engineers can sample and analyze reactor water chemistry and submit the data through the Internet via page 18 for detailed engineering analysis and commentary. Plant engineers can also view historical data at page 16, particularly relating to component cracking in the reactor fleet of reactors of the same type. With this data, the users can make a preliminary assessment about possible causes and corrections and compare their performance with other reactors.

When the data is received, detailed engineering analyses can be performed as is conventional. In the present example, the analysis will particularly review conductivity characteristics, chloride levels, and maintenance procedures such as whether hydrogen or the like has been injected during operation. This information is compared with similar plants' historical data stored in the historical database to determine deviations in level variations, etc., particularly in plants that did not experience cracking of the same component. When the analysis is complete, a detailed report can be forwarded to the plant by any suitable means such as over the Internet or by conventional methods.

The specific plant information can also be used or accessed by regulatory bodies, such as NRC for boiling water nuclear reactors, to adjust inspection programs and schedules.

With this invention, the user can interactively assess plant parameters and performance over a global network. The system allows the user to submit data and view the important plant performance information, such as chemistry element and nuclide data in a boiling water nuclear reactor, trends, and comparisons using automated methods. Users can access drop-down menus or the like to select a particular parameter, such as a chemistry species in a boiling water nuclear reactor environment to view its level against that level associated with the plant fleet. Users can also select an element to view its historical trending. The data is compiled automatically in a historical database and provides automatic plots of plant ranking, percentile and trending graphics. The data evaluation is particularly suitable for understanding the root causes of any events and providing consultation services to users.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of assessing plant parameters and performance over a global network, the method comprising:
   (a) compiling plant parameter and performance data from a plurality of operating plants, the plant parameter and performance data including at least water chemistry of each of the plurality of operating plants;
   (b) storing the plant parameter and performance data in a categorized historical database;
   (c) enabling access to the historical database over a global network; and
   (d) comparing plant parameter and performance data among the plurality of operating plants based on the plant parameter and performance data stored in the historical database.

2. A method according to claim 1, wherein step (a) is practiced by receiving the plant parameter and performance data from the plurality of operating plants over the global network.

3. A method according to claim 1, wherein step (b) is practiced by storing the plant parameter and performance data in the categorized historical database according to plant type, and wherein the comparing step is practiced by comparing plant parameter and performance data by plant type.

4. A method according to claim 1, further comprising performing engineering assessments based on the plant parameter and performance data stored in the historical database.

5. A method according to claim 1, wherein step (c) is practiced by enabling categorized access to the historical database according to input parameters.

6. A method according to claim 1, wherein the plurality of operating plants are boiling water nuclear reactor plants, and wherein the plant parameter and performance data comprises reactor water chemistry characteristics and reactor performance data, step (c) being practiced by enabling access to the historical database to determine current reactor performance trends and to predict future reactor behavior.

7. A method according to claim 6, wherein step (c) is practiced by enabling categorized access to the historical database according to input parameters and by displaying data for a particular one of the plurality of operating plants.

8. A computer system for assessing plant parameters and performance over a global network, the computer system comprising:

at least one user computer running a computer program that effects compiling of plant parameter and performance data from a plurality of operating plants and storing of the plant parameter and performance data in a categorized historical database, the plant parameter and performance data including at least water chemistry from each of the plurality of operating plants; and a system server running a server program, the at least one user computer and the system server being interconnected by a computer network, the system server enabling access to the historical database over the computer network and enabling comparing plant parameter and performance data among the plurality of operating plants based on the plant parameter and performance data stored in the historical database.

9. A computer program embodied on a computer readable medium for assessing plant parameters and performance over a global network, the computer program comprising:

means for compiling plant parameter and performance data from a plurality of operating plants, the plant parameter and performance data including at least water chemistry from each of the plurality of operating plants;

means for storing the plant parameter and performance data in a categorized historical database;

means for enabling access to the historical database over a global network; and means for comparing plant parameter and performance data among the plurality of operating plants based on the plant parameter and performance data stored in the historical database.

* * * * *